April 12, 1938.  A. C. JOHNSON ET AL  2,114,225
BATTERY CLAMP
Filed Jan. 25, 1937
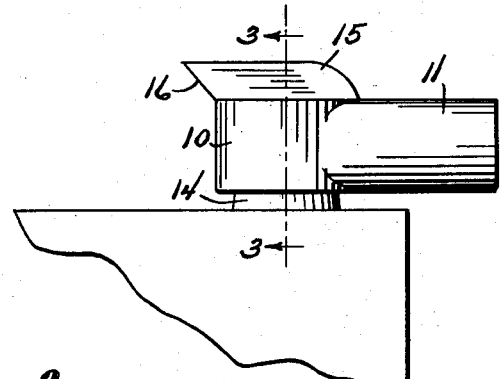
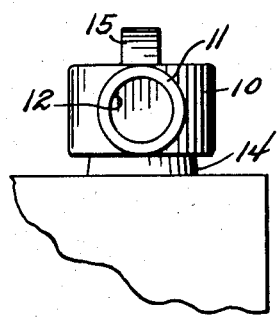
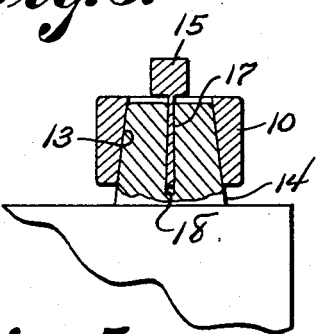
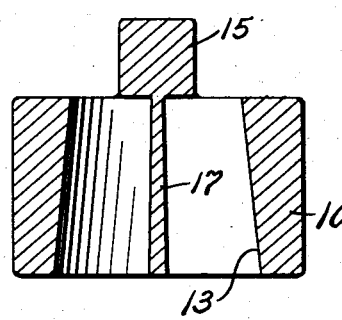
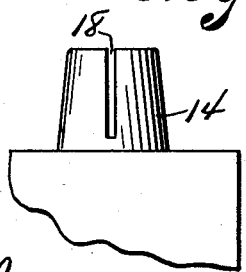
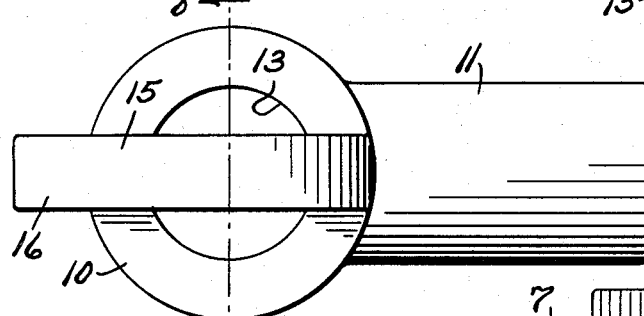
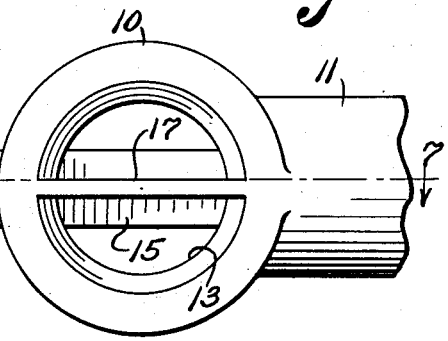
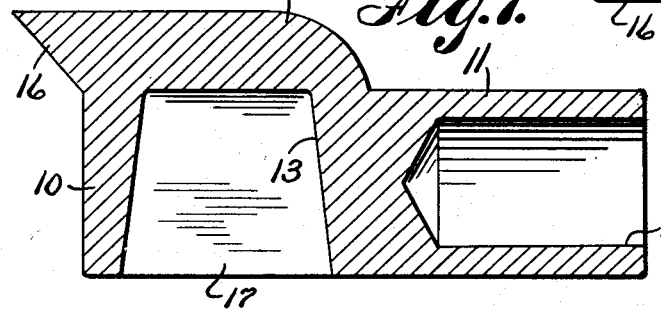
Arnold C. Johnson
Robert J. Porche
INVENTORS
BY Victor J. Evans & Co.
ATTORNEYS Patented Apr. 12, 1938

2,114,225

UNITED STATES PATENT OFFICE 2,114,225

BATTERY CLAMP

Arnold C. Johnson and Robert J. Porche, New Orleans, La.

Application January 25, 1937, Serial No. 122,259

3 Claims. (Cl. 173—259)

This invention relates to battery clamps and has for an object to provide a battery clamp which may be attached without the use of bolts and will include a wedge adapted to enter a slot cut through the center of a battery post and will include a ring having a tapered inner wall adapted to squeeze the malleable metal of the post tightly in rear of the wedge so that accidental dislodgment of the clamp will be positively prevented and the corrosive effect on the electrical connection will be lessened materially so that the device cannot work loose and produce a faulty connection.

A further object of the invention is to provide a one piece battery clamp which will be strong and durable, which will be inexpensive to manufacture and will not get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of the battery clamp constructed in accordance with the invention, in applied position on a battery post.

Figure 2 is an end elevation of the parts shown in Figure 1.

Figure 3 is a cross sectional view taken on the line 3—3 of Figure 1.

Figure 4 is a side elevation of the battery post having a slot cut therein to receive the wedge of the clamp.

Figure 5 is an enlarged top plan view of the clamp.

Figure 6 is an enlarged bottom plan view of the clamp.

Figure 7 is an enlarged longitudinal sectional view through the clamp.

Figure 8 is an enlarged cross sectional view of the clamp taken on the line 8—8 of Figure 5.

Referring now to the drawing in which like characters of reference designate similar parts in the various views, the clamp is shown to comprise a ring 10 having an integral lateral arm 11 provided with an axial bore 12 to receive a battery cable. The ring is provided with an upwardly tapered bore 13 which is the same size as the battery post at the bottom point 14 but gradually decreases in size toward the top of the post. An integral bar 15 projects across the top of the ring and extends beyond the ring, the underneath face of the bar sloping downwardly and providing a hammer face 16 for removing the clamp.

A wedge 17 is formed integral with the ring and with the bar and the widest part of the wedge is substantially in the plane of the bottom of the ring. In practice the base of the wedge may be of approximately the same thickness as the conventional hacksaw blade.

To apply the battery clamp a slot 18 is cut across the center of the battery post 14 with a hacksaw. The depth of the slot may be substantially the same as the width of the wedge 17. The wedge is now inserted in the top of the slot and a hammer may be used to strike down on the bar 15 and cause the ring 10 to move down on the malleable metal battery post 14. Since the bore of the ring is the same in size as the battery post at the bottom but gradually decreases in size toward the top of the post, as the ring moves downward the wedge 17 will be driven into the slot and simultaneously therewith the tapered wall of the ring will squeeze the malleable metal of the post against the wedge in rear of the base of the wedge so that the ring arrives at final position and the walls of the slot 18 in the post will be in intimate contact with the wedge throughout both sides of the wedge. Consequently a tight permanent union between the wedge and the clamp will exist and form good electrical connection between the parts to resist corrosion and resist dislodgment.

To remove the clamp it is simply necessary to hammer upwardly against the inclined hammer face 16 whereupon the ring will be dislodged upwardly and the wedge will press back the malleable metal of the post as it recedes until finally the clamp is freed from the post.

From the above description it is thought that the construction and operation of the invention will be fully understood without further explanation.

What is claimed is:

1. A battery clamp comprising a ring having a tapered bore, a wedge extending across the bore of the ring adapted to enter a slot cut through the center of a conventional battery post and being thickest at the bottom of the ring, the wall of the bore being adapted to squeeze the malleable metal of the battery post tightly in rear of the thickest part of the wedge when the ring is driven downward upon the post, and a battery cable holder projecting laterally of the ring.

2. A battery clamp comprising a ring having a tapered bore of the same size as a conventional battery post at the bottom but gradually decreases in size toward the top of the battery post, a wedge extending across the bore of the ring having its thickest part disposed at about the bottom of the ring, and a member integral with the top of the ring for receiving hammer blows to drive the ring down upon the battery post, the wedge being adapted to enter a slot cut through the center of a battery post while simultaneously the tapered wall of the ring will squeeze the malleable metal of the post tightly in rear of the thickest part of the wedge so that accidental dislodgment of the clamp will be positively prevented and good electrical connection promoted.

3. A battery clamp comprising a ring having a tapered bore, a bar integral with the top of the ring and extending diametrically thereacross, said bar projecting beyond the ring, a wedge integral with the bar and with the ring and extending diametrically across the ring, the thickest part of the wedge extending to about the bottom of the ring, the wedge being adapted to enter a slot cut through the center of a battery post when the ring is driven down upon the post, the tapered bore of the ring squeezing the malleable metal of the post tightly in rear of the thickest part of the wedge, and an obliquely disposed surface formed on said projecting end of said bar for permitting upward hammer blows thereupon to dislodge the clamp from the post.

ARNOLD C. JOHNSON.
ROBERT J. PORCHE.